United States Patent
Pershin (10) Patent No.: US 11,349,908 B2
(45) Date of Patent: May 31, 2022

(54) GENERATING TEMPLATES FOR DEPLOYMENT OF SYSTEM SERVICES

(71) Applicant: salesforce.com, inc., San Francisco, CA (US)

(72) Inventor: Aleksey Pershin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 241 days.

(21) Appl. No.: 16/687,376

(22) Filed: Nov. 18, 2019

(65) Prior Publication Data

US 2021/0152627 A1 May 20, 2021

(51) Int. Cl.
| | |
|---|---|
| *G06F 7/00* | (2006.01) |
| *H04L 67/10* | (2022.01) |
| *H04L 67/51* | (2022.01) |
| *G06F 16/22* | (2019.01) |
| *G06F 16/2458* | (2019.01) |

(52) U.S. Cl.
CPC .......... *H04L 67/10* (2013.01); *G06F 16/2228* (2019.01); *G06F 16/2468* (2019.01); *H04L 67/16* (2013.01)

(58) Field of Classification Search
CPC ............. G06F 16/2468; G06F 16/2228; G06F 9/44505; H04L 67/10; H04L 67/16; H04L 47/70; H04L 41/0843; H04L 41/5048; H04L 41/5096
See application file for complete search history.

(56) References Cited

U.S. PATENT DOCUMENTS

| | | | |
|---|---|---|---|
| 2007/0165937 A1* | 7/2007 | Markov | G06F 9/44505 382/141 |
| 2013/0268561 A1* | 10/2013 | Christie | G06F 16/211 707/777 |
| 2017/0180266 A1* | 6/2017 | Frank | H04L 67/16 |

OTHER PUBLICATIONS

Armory, "Armory: Spinnaker at Enterprise Scale," Date Unknown, pp. 1-10, [Online] [Retrieved on Feb. 18, 2020] Retrieved from the Internet <URL: https://www.armory.io/>.
Google Cloud, "Continuous Delivery Pipelines with Spinnaker and Google Kubernetes Engine," Date Unknown, pp. 1-12, [Online] [Retrieved on Feb. 18, 2020] Retrieved from the Internet: <URL: https://cloud.google.com/solutions/continuous-delivery-spinnaker-kubernetes-engine>.

(Continued)

*Primary Examiner* — Mohammad A Sana
(74) *Attorney, Agent, or Firm* — Fenwick & West LLP (57) ABSTRACT

A system uses templates to generate data structures, for example, pipelines for deploying services in cloud based system. A template contains templating expressions used as placeholders for actual values. The generated data structure may be modified, for example, using an application. The system generates a reverse substitution map that associates actual values used in a data structure instance with a corresponding templating expression used as placeholders for the actual values. The system generates a modified version of the template for a modified version of the data structure by replacing actual values with the corresponding templating expressions from the reverse substitution map. The system can use the modified template to generate other instances of data structure that include the modifications made to the data structure.

20 Claims, 6 Drawing Sheets

(56) References Cited

OTHER PUBLICATIONS

Google Cloud, "Install and Manage Spinnaker on Google Cloud Platform," Date Unknown, pp. 1-17, [Online] [Retrieved on Feb. 18, 2020] Retrieved from the Internet <URL: https://cloud.google.com/docs/ci-cd/spinnaker/spinnaker-for-gcp>.

Netflix Technology Blog, "Global Continuous Delivery with Spinnaker," Nov. 16, 2015, pp. 1-5, [Online] [Retrieved on Feb. 18, 2020] Retrieved from the Internet <URL: https://netflixtechblog.com/global-continuous-delivery-with-spinnaker-2a6896c23ba7>.

Rouse, M., "Netflix Spinnaker," Nov. 2018, pp. 1-2, [Online] [Retrieved on Feb. 18, 2020] Retrieved from the Internet: <URL: https://searchitoperations.techtarget.com/definition/Netflix-Spinnaker>.

Spinnaker, "Google Cloud Build," Date Unknown, pp. 1-4, [Online] [Retrieved on Feb. 18, 2020] Retrieved from the Internet <URL: https://www.spinnaker.io/setup/ci/gcb/>.

Spinnaker, "Spinnaker: Cloud Native Continuous Delivery: Fast, safe, repeatable deployments for every Enterprise," Date Unknown, pp. 1-5, [Online] [Retrieved on Feb. 18, 2020] Retrieved from the Internet <URL: https://www.spinnaker.io/>.

Vizard, M., "Google Extends Spinnaker Continuous Delivery Platform to Kubernetes," Oct. 24, 2018, pp. 1-5, [Online] [Retrieved on Feb. 18, 2020] Retrieved from the Internet <URL: https://containerjournal.com/topics/container-management/google-extends-spinnaker-continuous-delivery-platform-to-kubernetes/>.

Wikipedia, "Spinnaker (software)," Date Unknown, two pages, [Online] [Retrieved on Feb. 18, 2020] Retrieved from the Internet: <URL: https://en.wikipedia.org/wiki/Spinnaker_(software)>.

* cited by examiner

```
Receive a pipeline obtained by
modifying a source pipeline
510
          ↓
Access the reverse substitution
map of the pipeline
520
          ↓
```

For each entry (V, E) in the reverse substitution map

```
Identify all occurrences of the
actual value V in the pipeline
530
          ↓
Replace occurrences of actual
value V in the pipeline with the
templating expression E
540
```

GENERATING TEMPLATES FOR DEPLOYMENT OF SYSTEM SERVICES

BACKGROUND

Field of Art

This disclosure relates in general to processing templates, and in particular to reconstruction of templates used for deployment of system services.

Description of the Related Art

Enterprises use cloud computing systems such as AMAZON WEB SERVICES (AWS), GOOGLE CLOUD PLATFORM (GCP) and others for compute power, database storage, content delivery, machine learning, or other functionality. Enterprises frequently deploy services on such cloud computing systems. Enterprises use tools for deployment of services in cloud based systems, for example, SPINNAKER. Such tools allow a user to specify a pipeline describing a sequence of actions that need to be performed to deploy a service on a cloud based system. Examples of such actions include creating a virtual machine (VM) image, deploying a cluster of VMs, disabling a cluster, and so on.

A pipeline specification is for a specific target and uses specific parameters for that target. A target can be a cluster of computing systems or an account. The parameters of the service and the target are embedded in the specification of the pipeline. A pipeline configured for a specific target cannot be used for deployment to other targets. Enterprises may have large number of targets in which services are deployed, thereby requiring several pipelines that are similar in structure but have different parameter values for different targets.

Pipeline templates can be used to generate pipelines for different targets. A system administrator may have to edit a pipeline obtained from a template, for example, using a user interface. However, editing the pipeline causes the pipeline to become out of sync with the template used for generating the pipeline. As a result, the changes made to one pipeline cannot be propagated to other pipelines. Manually propagating the changes can be an error prone and cumbersome process.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

A system uses pipeline templates to generate pipelines that define actions for deploying a service in a system, for example, a cloud based system. The process of generating a pipeline from a template is referred to as hydration of the pipeline template. A pipeline may be represented using a particular data format, for example, JavaScript Object Notation (JSON) format, extensible markup language (XML) format, or YAML format.

A pipeline is configured for deployment to a particular target. A pipeline template contains templating expressions used as placeholders for actual values used in the deployment. For example, a templating expression may be replaced by target specific parameter values or expressions. Multiple pipeline instances may be generated by hydrating the pipeline template for different targets.

A generated pipeline may be modified, for example, using an application configured to read the specification of the pipeline. However, any changes made to a particular pipeline instance cannot be propagated to other pipeline instances or to the corresponding pipeline template. Embodiments of the invention allow changes to a pipeline instance to be propagated to the corresponding pipeline template. This allows the system to generate other pipeline instances that include the changes made to the first pipeline. Furthermore, the system can generate new pipeline instances for new targets that may be identified. Accordingly, in an evolving system that has frequent changes in targets due to additions and deletions, the system is able to automatically generate pipeline instances without requiring development effort.

The system generates a reverse substitution map that associates actual values used in a pipeline instance with the corresponding templating expression used as placeholders for the actual values. The system accesses the modified version of the pipeline instance. The system generates a modified version of the pipeline template by replacing the actual values in the modified pipeline instance with the corresponding templating expressions from the reverse substitution map. The system can use the modified pipeline template to generate other pipeline instances that include the modifications made to the first pipeline instance.

Although embodiments are described in connection with pipelines used for deploying services, the techniques described can be used for other purposes. For example, templates can be used to generate any data structure or representation. The generated data structure may represent a web page, a structured document, a user interface, a set of instructions and so on. The template includes templating expressions that are replaced by actual values in the data structure. The generated data structure may be modified, for example, using a tool or application configured to read the data structure. The system generates a reverse substitution map that associates each of the actual values used in the generated data structure with a corresponding templating expression. The system accesses a second data structure that uses the same actual values as the first data structure, for example, a second data structure obtained by modifying the first data structure. The system generates a second template by replacing the actual values in the second data structure with the corresponding templating expressions from the reverse substitution map. The system can use the second template to generate other instances of the data structure that map the second data structure and include the modifications made to the first data structure to obtain the second data structure.

System Environment

Figure 1:
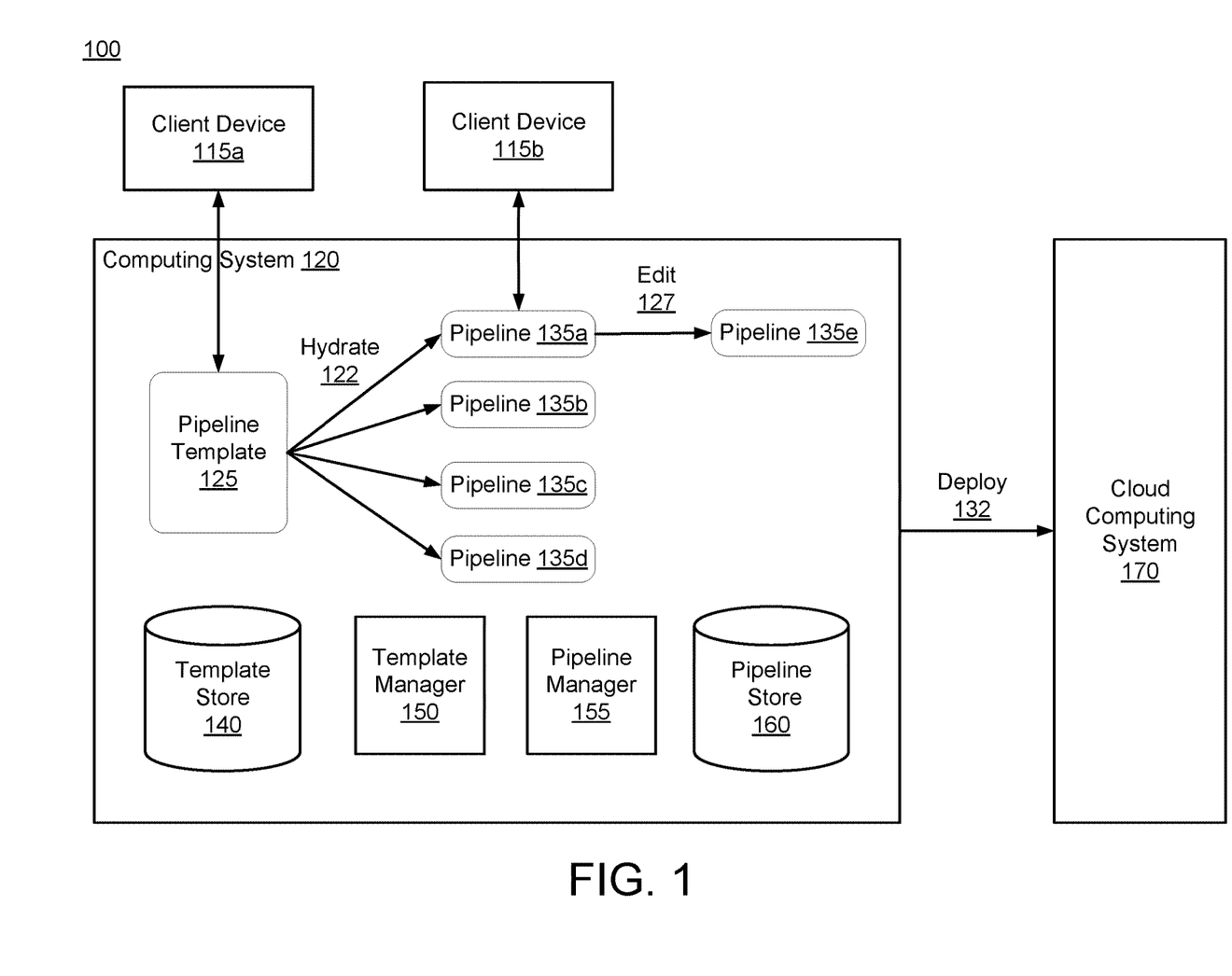
FIG. 1 is a block diagram of a system environment for using pipeline templates for deploying services, according to one embodiment.

FIG. 1 is a block diagram of a system environment for using pipeline templates for deploying services, according to one embodiment. The system environment 100 includes a computing system 120 that communicates with users via client devices 115 and deploys services in cloud computing system 170. The computing system 120 includes a template manager 150, a pipeline manager 155, a template store 140, and a pipeline store 160. The computing system 120 may include other components not shown in FIG. 1, for example, other types of data stores, and so on. The system environment 100 may include other elements not shown in FIG. 1, for example, a network.

The computing system 120 allows users, for example, developers to develop pipelines used for deploying 132 services on the cloud computing system 170. The computing system 120 is part of an enterprise that uses services of the cloud computing system 170. There can be multiple computing systems 120 of the enterprise. The cloud computing system 170 provides computational resources, storage resources, and other services that can be used by any enterprise.

A user can use a client device 115 to interact with the computing system 120 for developing and editing a deployment pipeline. An example of a tool for editing a deployment pipeline is SPINNAKER. A pipeline definition can be specified using a language that allows representation of data structures, for example, JSON (JavaScript Object Notation), XML (extended markup language), YAML, and so on. The pipelines 135 are stored in the pipeline store 160.

A pipeline may have target-specific parts, for example, names of zones, computing systems, and so on. The following is an example of a pipeline with target specific parts underscored.

```
"clusters": [
    {
        "account": "demoec2puppert-aws-rddev",
        "availabilityZones": {
            "us-west-2": [
                "us-west-2a", "us-west-2b", "us-west-2c", "us-west-2d"
            ]
        },
        ...
    },
],
```

The computing system 120 receives specification of pipeline template 125 corresponding to a pipeline. A pipeline template is also referred to herein as a template and a deployment pipeline is also referred to herein as a pipeline. The pipeline template 125 may be developed by users by inspecting a pipeline and may involve significant development time. However, once a pipeline template is developed, it can be used for generating pipelines for several targets. The process of generating pipelines from a template is referred to as hydration 122. Several pipelines 135a, 135b, 135c, and 135d may be obtained by hydrating the template 125. The templates are stored in the template store 140.

A template includes templating expressions that may represent expressions of template variables. A templating expression is identified within the template using markers so that the templating expressions can be identified by a computer program, for example, an application or a script. The markers include a begin marker, for example, "{{" that identifies the start of the templating expression and an end marker "}}" that identifies the end of the templating expression. The beginning marker and the ending markers can be special characters or sequences of special characters that are not expected to occur in the template except in connections with a templating expression for identifying the templating expression. A computer program that processes templates may allow mechanisms for escaping the markers so that markers can be included in non-templated portions of the document. However, the computer program processing the template is configured to ignore markers that have been escaped and process markers that have not been escaped.

The following is an example of a template corresponding to the example pipeline above.

```
"clusters": [
    {
        "account": {{ vars.target.account.name }},
        "availabilityZones": {
            {{ vars.target.region }}:
                {{ vars.target.availability_zones }}
        },
        ...
    },
],
```

The template variables represent parameters that may be replaced with specific values for a given target to generate a pipeline instance specific to that target. For example, a template variable "account_id" may be replaced with an actual value of account_id, for example, "12345" during hydration. The template hydration module may access a data source, for example, a configuration file or a database to identify actual values of parameters used in templating expressions. For example, a template variable may represent a set of computing systems of a cluster. A database may be used to store the set of computing systems for each target. The system accesses the database to determine the value of the templating expression based on the template variable.

The pipeline manager 155 performs various operations related to a pipeline including executing the pipeline, modifying the pipeline, and others. The pipeline manager 155 allows a user to view a pipeline and modify the pipeline. A user can interact with the pipeline manager 155 to edit 127 a pipeline using a user interface. For example, pipeline 135e is obtained by modifying pipeline 135a. Once a pipeline is edited, it does not match the template used to generate the pipeline.

The pipeline manager is configured to allows users to edit a pipeline but does not allow editing of the template used to generate the pipeline. This is so because the template may use a data format that is distinct from the data format used by the pipeline. The data format of the template is suitable for processing by the template hydration module 310. For example, the pipeline may be specified using JSON format but the template may include constructs that do not conform to JSON format. Accordingly, an application configured to process the pipeline may be able to process JSON format but not necessarily the data format used by the template.

Figure 3:
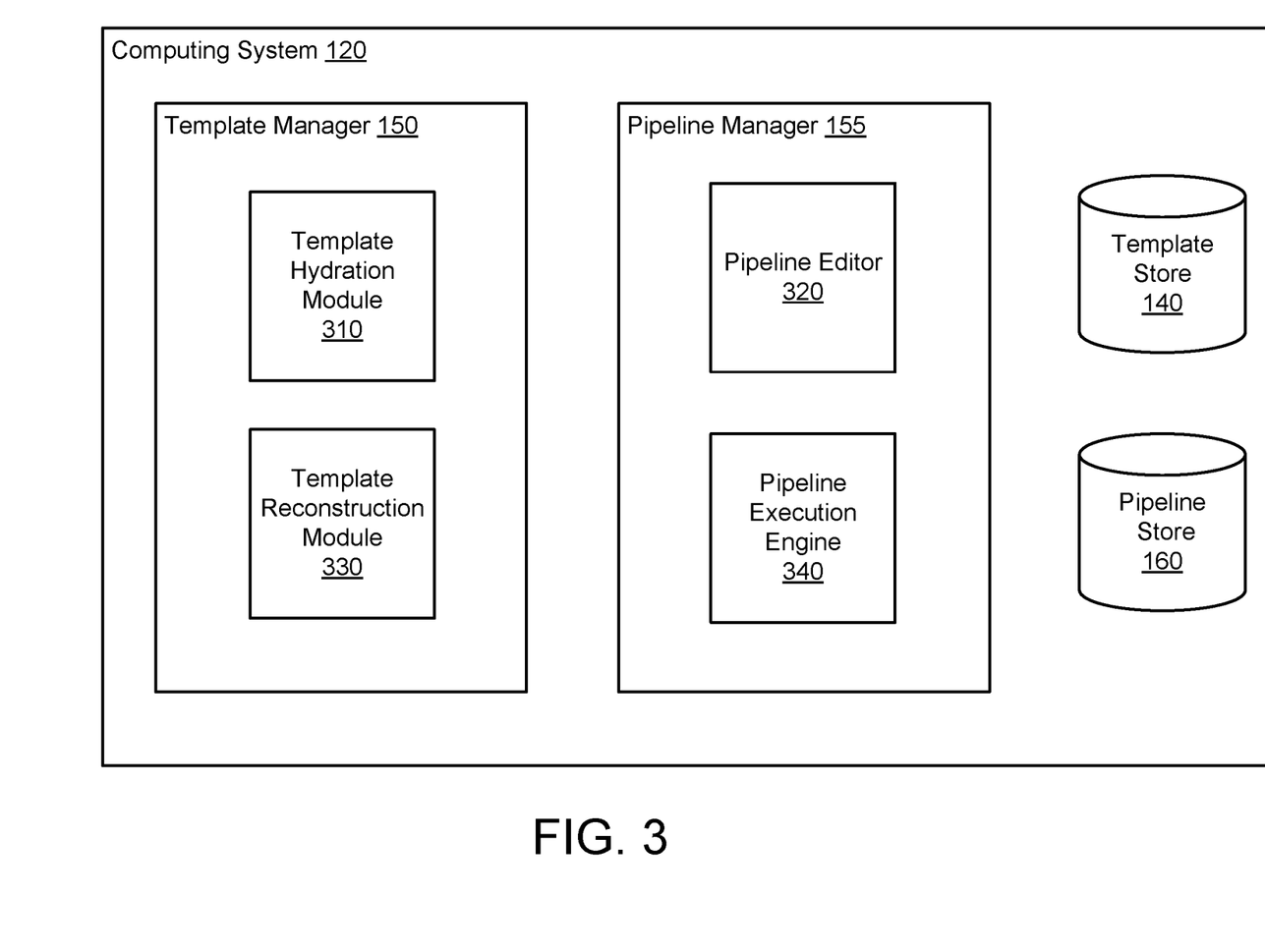
FIG. 3 is a block diagram illustrating components of the computing system for processing templates and pipelines, according to one embodiment.

The template manager 150 performs various processes related to a template including hydration of templates and also modifying templates if a pipeline is edited. Details of the template manager 150 are shown in FIG. 3 and described in connection with FIG. 3. The template manager 150 updates the template if a pipeline obtained by hydrating the template is edited.

Figure 2:
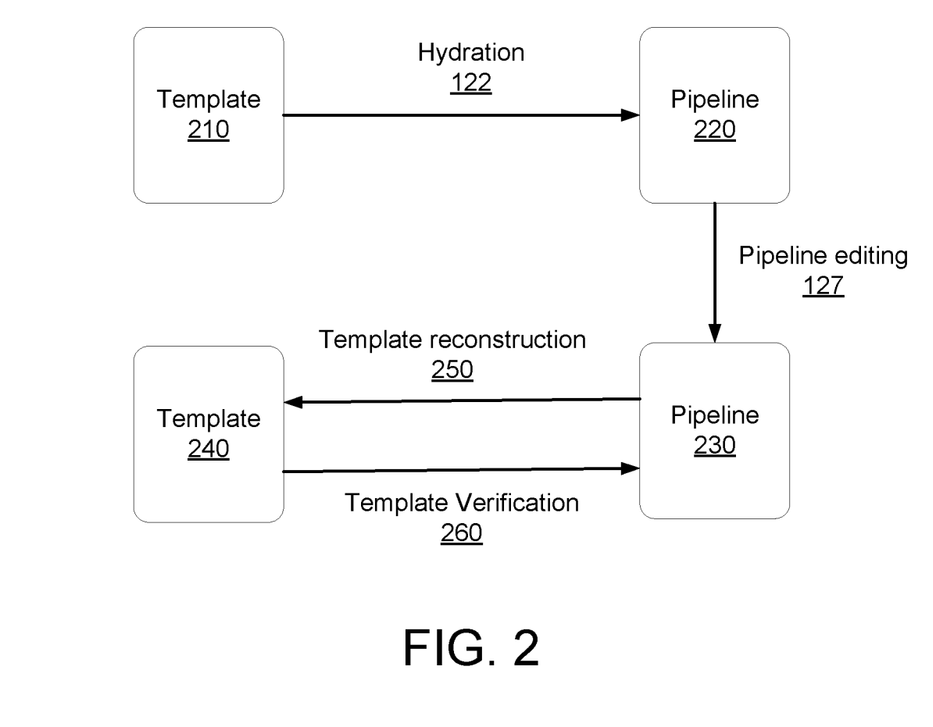
FIG. 2 is a diagram showing an example illustrating the process of updating a template when a pipeline is modified, according to an embodiment.

FIG. 2 is a diagram showing an example illustrating the process of updating a template when a pipeline is modified, according to an embodiment. FIG. 2 shows a template 210 that may be generated by a user. The computing system 120 performs hydration 122 to generate one or more pipelines, for example, pipeline 220 configured for deployment to target T1.

A user uses a user interface of an application to edit the pipeline 220 to obtain pipeline 230 that is also configured for deployment to target T1. The template manager 150 performs a process of template reconstruction 250 to obtain a template 240 corresponding to the modified pipeline 230. The computing system 120 can subsequently hydrate the template 240 to generate multiple pipelines that correspond to the modified pipeline 230 but are configured for deployment to other targets, for example, targets T2, T3, T4, and so on.

If the computing system 120 hydrates the template 240 for target T1, the hydrated pipeline should match pipeline 230. The computing system 120 verifies 260 that the template 240 was reconstructed correctly by hydrating the template 140 for the target corresponding to the pipeline 230 and comparing the hydrated pipeline with pipeline 230. If the hydrated pipeline obtained from the reconstructed template 240 fails to match the modified pipeline 230, the system returns an error indicating some problem with the process of template reconstruction 250.

The computing system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The computing system 120 may interact with the client devices 115 and the cloud computing system 170 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

FIG. 3 is a block diagram illustrating components of the computing system for processing templates and pipelines, according to one embodiment. The computing system 120 includes a template manager 150, a pipeline manager 155, a template store 140, and a pipeline store 160. The template manager 150 comprises a template hydration module 310, and a template reconstruction module 330. The pipeline manager 150 comprises a pipeline editor 320 and a pipeline execution engine 340. Other embodiments can have different and/or other components than the ones described here. Furthermore, the functionalities described herein can be distributed among the components in a different manner.

The pipeline editor 320 of the pipeline manager 155 is an application that allows a user to make changes to a pipeline. In an embodiment, the pipeline editor 320 processes the description of a pipeline to present a visual representation displayed via a user interface. The user interface allows a user to modify the pipeline via commands such as deleting a portion, moving a portion, adding a new portion, and so on. The pipeline execution engine 340 of the pipeline manager 155 reads the instructions specified in a pipeline and executes them.

The template hydration module 310 of the template manager 150 performs the process of hydration 122 to generate one or more pipelines from a template. The template hydration module 310 may execute a script that incudes instructions for reading a pipeline template and generating a pipeline based on the template. During the process of hydration, the template hydration module 310 evaluates templating expressions using target specific values. The process of hydration may be performed by a computer program, for example, an application or a script that includes instructions for evaluating the templating expressions using the target specific values. The instructions may obtain the target specific values from a data source, for example, a database. Accordingly, the process of hydration may execute a query against a database to determine values that need to be used when evaluating template expressions in the pipeline.

The template reconstruction module 330 of the template manager 150 receives a pipeline that may have been modified by a user using a pipeline editor 320. The reverse templatization module 330 generates a template from the received pipeline. To reconstruct a template from a pipeline, the template reconstruction module 330 uses a reverse substitution map that maps portions of the pipeline to portions of the template. The template reconstruction module 330 executes the processes further described herein to reconstruct a template from a pipeline.

Overall Process

Figure 4:
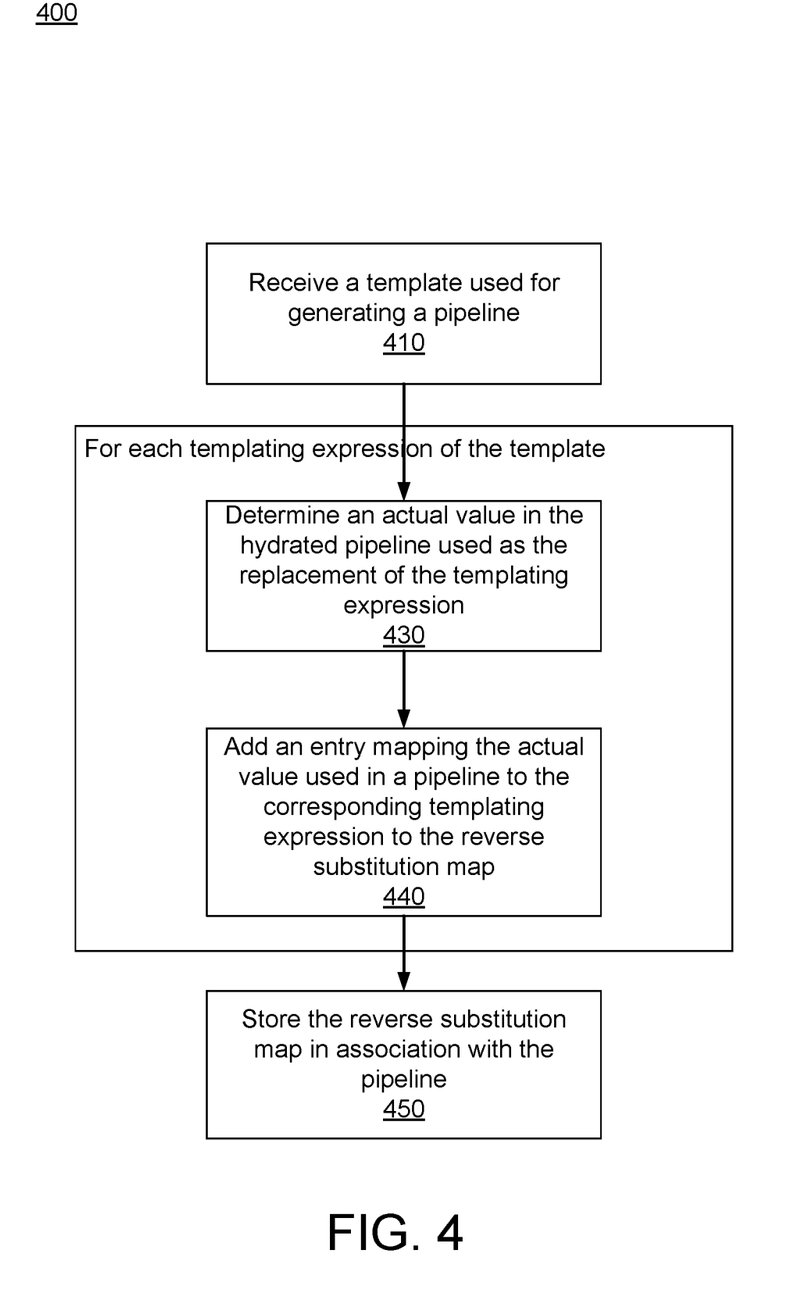
FIG. 4 is a flow chart illustrating the overall process for generating a reverse substitution map according to an embodiment.

FIG. 4 is a flow chart illustrating the overall process for generating a reverse substitution map according to an embodiment. Other embodiments can perform the steps of these flowcharts in different orders. Other embodiments can include different and/or additional steps than the ones described herein.

The template manager 150 receives 410 a template used for generating a pipeline by hydration. The template defines a set of actions for deploying a service. The template includes a set of templating expressions as placeholders. The templating expressions are replaced with actual values of the pipeline during a hydration process. The actual values may be associated with a target and are used for deploying the service to that target.

The template manager 150 builds a reverse substitution map that maps actual values of the pipeline to templating expressions that generated the actual values. For each templating expression of the template, the template manager 150 determine 430 the actual value in the hydrated pipeline used as the replacement of the templating expression. The template manager 150 adds 440 an entry to the reverse substitution map comprising a tuple mapping the actual value to the templating expression.

In an embodiment, the template manager 150 determines entries of the reverse substitution map by evaluating individual templating expressions through the process of hydration. For example, the template hydration module 310 is configured to receive an individual templating expression E and generate the actual values V for a target according to the hydration process using the actual template values for the target. For example, evaluating templating expression {{vars.target.spinnaker_account.name}} may produce actual value "demoec2puppert-aws-rddev". The template manager 150 adds the tuple (V, E) to the reverse substitution map. In the above example, the template manager 150 adds a tuple ("demoec2puppert-aws-rddev", {{vars.target.spinnaker_account.name}}) to the reverse substitution map.

The template manager 150 stores 450 the reverse substitution map in connection with the pipeline. For example, the template manager 150 may store the reverse substitution map within the specification of the pipeline using a part of the pipeline specification that is ignored by the pipeline editor.

Figure 5:
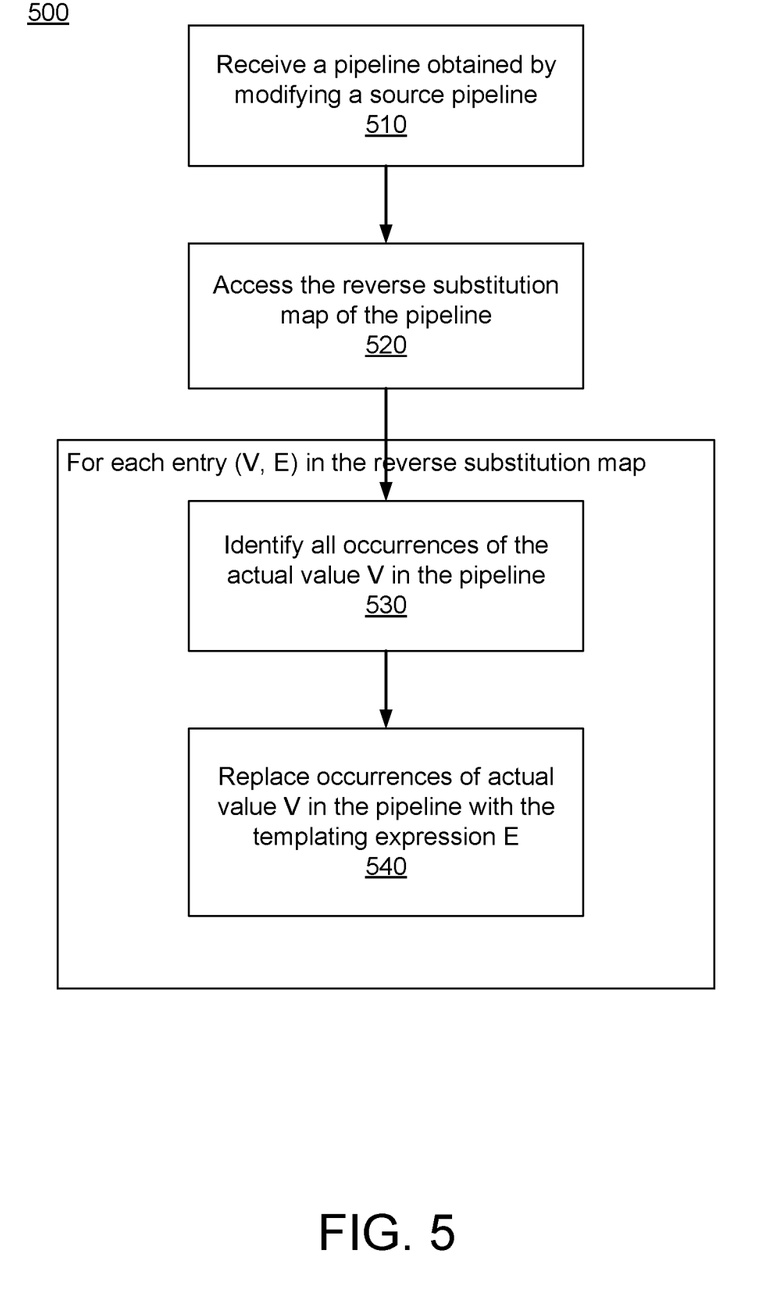
FIG. 5 is a flow chart illustrating the overall process of reconstructing a template for a modified pipeline according to an embodiment.

FIG. 5 is a flow chart illustrating the overall process of reconstructing a template for a modified pipeline according to an embodiment. Other embodiments can perform the steps of these flowcharts in different orders. Other embodiments can include different and/or additional steps than the ones described herein.

The template manager 150 accesses 510 a pipeline that may have been obtained by modifying a source pipeline. Assume that the pipeline is configured for a target T. The template manager 150 accesses 520 the reverse substitution map associated with the received pipeline. The reverse substitution map may be stored separately in association with the pipeline. Alternatively, the reverse substitution map may be stored using a key within the pipeline.

The reverse substitution map stores several entries, each entry may be represented as a tuple comprising at least two elements (V, E), where (1) V represents an actual value in the pipeline that is obtained by hydration of a templating expression and (2) E represents the templating expression used for obtaining the actual value. The template manager 150 repeats the following steps 530 and 540 for each entry (V, E) of the reverse substitution map. The template manager 150 identifies 530 all occurrences of actual value V in the pipeline. The template manager 150 replaces 540 each occurrence of the actual value V with the templating expression E. In the above example of tuple ("demoec2puppert-aws-rddev", {{vars.target.spinnaker_account.name}}), the template manager 150 replaces all occurrences of "demoec2puppert-aws-rddev" with templating expression {{vars.target.spinnaker_account.name}}.

In an embodiment, the system regenerates the pipeline for the target T using the reconstructed template. The system verifies if the regenerated pipeline matches the received pipeline used to reconstruct the template. If the regenerated pipeline fails to match the received pipeline, the system returns an error, for example, by sending a message indicating that the process of reconstruction may have failed.

The process of modifying a pipeline may introduce whitespaces. Examples of whitespaces include spaces, tabs, and new lines. The pipeline may be represented using a format for representing structured documents such as JSON, XML, YAML, and so on. Whitespaces are optional in these formats. As a result, an editor may add or remove whitespaces. For example, the editor may change indentation to use 3 spaces instead of 2 spaces, thereby adding an extra space for every indentation.

In an embodiment, the system matches V against the pipeline such that logical whitespaces are ignored. The system does not ignore whitespaces that may occur inside strings or tokens. For example, the system does not treat a token "hello world" as equivalent to a string "helloworld". However, the system treats a value ["a", "b"], as equivalent to a value ["a", "b" ]. In an embodiment, the system performs a fuzzy search for V in the pipeline that ignores logical white spaces. Whitespaces may be introduced while modifying the pipeline instance. Ignoring whitespaces allows the system to compare the actual value in the modified pipeline with the actual value of the tuple.

The technique disclosed is able to reconstruct templates from certain types of modifications to pipelines, for example, moving of actual values from one location in the pipeline to another, deleting of an actual value, copying of an actual value, and so on. The modified pipeline may have more or fewer instances of actual values than the original pipeline.

Furthermore, the hydration of each templating expression is expected to be deterministic, i.e., always results in same actual value, no matter how many times the templating expression is hydrated. These include simple variable references, complex expressions, conditional expressions, function and macro calls, and others.

The system assumes that the actual values generated from templating expressions are unique. In an embodiment, the system compares actual values across various entries of a reverse substitution map to ensure that all actual values in the entries are unique. If the system determines that two entries result in same actual value, the system returns an error indicating that the process would fail while reconstructing templates using the reverse substitution map. Furthermore, the system assumes that the actual values generated from templating expressions are unique within the entire hydrated pipeline instance in the sense that all occurrences of an actual value should be replaced with the corresponding templating expression. For example, the actual value equal to "1" is not unique enough because not all occurrences of "1" in the modified pipeline instance should be replaced with the corresponding templating expression.

The modification of a pipeline is not allowed inside an actual value. For example, the user is not allowed to modify a portion of the actual value. The modified pipeline cannot introduce new portions that should be templatized to new templating expressions that were not present in the original template.

Some embodiments remove these restrictions. For example, the technique disclosed above for ignoring whitespaces during matching of values allows for modifications that change logical whitespaces but not whitespaces within tokens and strings. For example, the system may relax the restriction that all actual values need to be unique by limiting the scope of a templating expression. Accordingly, the system receives instructions from a developer of the pipeline to associate each templating expression with a context that may be specified using an expression that describes a portion of the data structure representing the pipeline. When a user develops the original template, the user specifies the context dependency for all templating expressions. For example, if the pipeline is a structured document, for example, JSON, XML, YAML, the system specifies a key name or a path to limit the scope of the templating expression. Accordingly, the system applies that entry of the reverse substitution map only in the specified context. For example, the template manager 150 captures the context information and adds it to the reverse templatization map. Accordingly, each entry in the reverse substitution map represents a mapping (V, C)→E, i.e., a mapping from value V and context C to templating expression E. If the same actual value occurred in other contexts, the system does not apply that entry to those occurrences.

Alternate Embodiments

The techniques disclosed herein can be used for other applications and are not limited to generating pipelines for deploying services. In an embodiment, a template is configured to generate a structured document, for example, a PDF document, a web page, an XML document, a JSON document, a YAML document, and so on. The template may be configured to generate a set of instructions that can be processed by a computer processor. The set of instructions may be specified using a programming language. The system may replace parameters of each templating expression to generate a block of code of the set of instructions.

The template includes templating expressions that are replaced with actual values of the structured document to generate different instances of the structured document. A system may modify a generated structured document. For example, the structured document may be edited manually by a user or modified using an application configured to read the structured document and allow a user to make changes. The processes disclosed herein allow the system to generate a new template from the modified structured document. The new template can be used to generate other instances of the structured document that have changes matching the modified structured document.

The system accesses a template T1 configured to generate a data structure. The template T1 includes templating expressions as placeholders for actual values used in instantiations of the data structure. The system accesses a data structure D1 generated by instantiating the template T1 using the actual values. The system accesses a reverse substitution map that associates each of the actual values used in the data structure D1 with the corresponding templating expression used in T1 to obtain the actual value. The system receives a data structure D2 that uses the same actual values as the data structure D1. For example, D2 may have been obtained by modifying D1. The system generates a template T2 by replacing the actual values in the data structure D2 with the corresponding templating expressions from the reverse substitution map. The system can further use T2 to generate other data structures D3, D4, D5, D6, and so on, that include the changes in D2 compared to D1.

Computer Architecture

Figure 6:
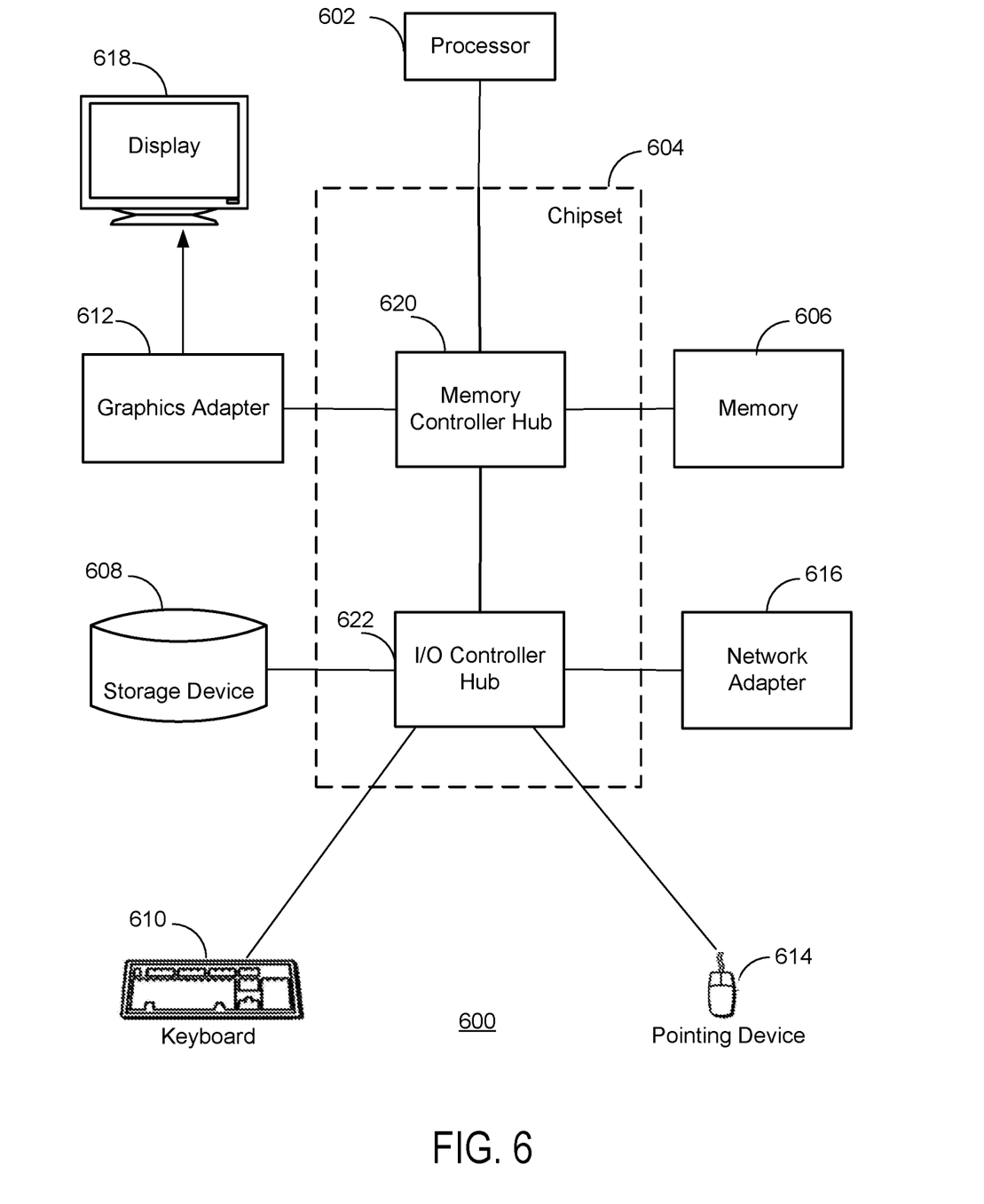
FIG. 6 is a block diagram illustrating a functional view of a typical computer system according to one embodiment.

FIG. 6 is a high-level block diagram illustrating a functional view of a typical computer system for use as one of the entities illustrated in the environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device 115 may be a mobile phone with limited processing power, a small display 618, and may lack a pointing device 614. The multi-tenant system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

I claim:

1. A computer implemented method for generating a modified pipeline template, the method comprising:
   accessing a pipeline template that defines a set of actions for deploying a service, the pipeline template containing templating expressions as placeholders for actual values used in the deployment;
   accessing a pipeline instance generated by hydrating the pipeline template by evaluating the templating expressions of the pipeline template using the actual values;
   generating a reverse substitution map associating each of the actual values used with a corresponding templating expression used as placeholder for the actual value;
   accessing a modified version of the pipeline instance; and
   generating a modified version of the pipeline template by replacing the actual values in the modified pipeline instance with the corresponding templating expressions from the reverse substitution map.

2. The computer-implemented method of claim 1, wherein each templating expression is identified within the pipeline template using marker symbols.

3. The computer-implemented method of claim 1, wherein the reverse substitution map comprises entries, wherein each entry comprises an actual value and a templating expression, wherein generating the modified version of the pipeline template comprises:
   for each entry of the reverse substitution map:
      for each occurrence of the actual value of the entry in the modified pipeline instance, replacing the actual value in the modified pipeline instance by the templating expression.

4. The computer-implemented method of claim 1, further comprising:
   for each entry of the reverse substitution map:
      searching for occurrences of the actual value of the entry in the modified pipeline instance, using a fuzzy search that ignores logical white spaces while matching values.

5. The computer-implemented method of claim 1, wherein generating the reverse substitution map comprises:
   generating, from the modified version of the pipeline template, a plurality of pipeline instances; and
   for each of the plurality of pipeline instances, deploying one or more resources according to instructions stored in the pipeline instance.

6. The computer-implemented method of claim 1, wherein the pipeline instance is represented using one of:
   JavaScript Object Notation (JSON) format,
   extensible markup language (XML) format, or
   YAML format.

7. The computer-implemented method of claim 1, wherein the modified pipeline instance is for a given set of template variables, further comprising:
   generating, from the modified version of the pipeline template, a new pipeline instance for the same set of template variables; and
   determining whether the new pipeline instance matches the modified pipeline instance.

8. The computer-implemented method of claim 7, further comprising:
   determining that the new pipeline instance fails to match the modified pipeline instance; and
   responsive to determining that the new pipeline instance fails to match the modified pipeline instance, reporting an error in generating the modified version of the pipeline template.

9. A computer implemented method for generating a template for a data structure, the method comprising:
   accessing a first template for a data structure, the first template containing templating expressions as placeholders for actual values used in instantiations of the data structure;
   accessing a first data structure generated by hydrating the first template by evaluating templating expressions of the first template using the actual values;
   accessing a reverse substitution map that associates one or more actual values used in the first data structure with the corresponding templating expression used to obtain the actual value;
   accessing a second data structure obtained by modifying the first data structure; and
   generating a second template by replacing the actual values in the second data structure with the corresponding templating expressions from the reverse substitution map.

10. The computer-implemented method of claim 9, wherein the first data structure generated from the first template represents one of:
   a user interface;
   a structured document; or
   a set of instructions.

11. The computer-implemented method of claim 9, wherein a templating expression is identified within the template using marker symbols.

12. The computer-implemented method of claim 9, wherein the reverse substitution map comprises entries, wherein each entry comprises an actual value and a templating expression, further comprising generating a modified version of the template, comprising:
   for each entry of the reverse substitution map:
      for each occurrence of the actual value of the entry in the second data structure, replacing the actual value in the second data structure by the templating expression.

13. The computer-implemented method of claim 9, wherein the data structure is represented using one of:
   JavaScript Object Notation (JSON) format,
   extensible markup language (XML) format, or
   YAML format.

14. The computer-implemented method of claim 9, further comprising:
   generating, from the second template, a new data structure; and
   determining whether the new data structure matches the second data structure.

15. The computer-implemented method of claim 14, further comprising:
   determining that the new data structure fails to match the second data structure; and
   responsive to determining that the new data structure fails to match the second data structure, reporting an error in generating the second template.

16. A computer system comprising:
   a computer processor; and
   a non-transitory computer readable storage medium storing instructions that when executed by the computer processor cause the computer processor to execute instructions for performing steps comprising:
      accessing a pipeline template that defines a set of actions for deploying a service, the pipeline template containing templating expressions as placeholders for actual values used in the deployment;
      accessing a pipeline instance generated by hydrating the pipeline template by evaluating the templating expressions of the pipeline template using the actual values;
      generating a reverse substitution map associating each of the actual values used with a corresponding templating expression used as placeholder for the actual value;
      accessing a modified version of the pipeline instance; and
      generating a modified version of the pipeline template by replacing the actual values in the modified pipeline instance with the corresponding templating expressions from the reverse substitution map.

17. The computer system of claim 16, wherein the reverse substitution map comprises entries, wherein each entry comprises an actual value and a templating expression, wherein instructions for generating the modified version of the pipeline template comprise instructions for:
   for each entry of the reverse substitution map:
      for each occurrence of the actual value of the entry in the modified pipeline instance, replacing the actual value in the modified pipeline instance by the templating expression.

18. The computer system of claim 16, wherein instructions for generating the reverse substitution map comprise instructions for:
   generating, from the modified version of the pipeline template, a plurality of pipeline instances; and
   for each of the plurality of pipeline instances, deploying one or more resources according to the instructions stored in the pipeline instance.

19. A non-transitory computer readable memory storing instructions for generating a template for a data structure, the instructions that when executed by a computer processor cause the computer processor to perform steps comprising:
   accessing a first template for a data structure, the first template containing templating expressions as placeholders for actual values used in instantiations of the data structure;
   accessing a first data structure generated by hydrating the first template by evaluating templating expressions of the first template using the actual values;
   accessing a reverse substitution map that associates one or more actual values used in the first data structure with the corresponding templating expression used to obtain the actual value;
   accessing a second data structure obtained by modifying the first data structure; and
   generating a second template by replacing the actual values in the second data structure with the corresponding templating expressions from the reverse substitution map.

20. The non-transitory computer readable memory of claim 19, wherein the pipeline instance is represented using one of:
   JavaScript Object Notation (JSON) format,
   extensible markup language (XML) format, or
   YAML format.

* * * * *